United States Patent [19]
Myers

[11] 4,383,385
[45] May 17, 1983

[54] LURE CONTAINER

[76] Inventor: Wayne A. Myers, Stanton La., Pawcatuck, Conn. 06379

[21] Appl. No.: 253,870

[22] Filed: Apr. 13, 1981

[51] Int. Cl.$^3$ ............................................ A01K 97/06
[52] U.S. Cl. .................................. 43/57.1; 224/920; 229/5.5
[58] Field of Search ......... 43/54.5 A, 54.5 R, 57.5 A, 43/57.5 R, 25.2; 220/375, 339; 224/920; 229/4.5, 5.5

[56] References Cited

U.S. PATENT DOCUMENTS

| | | | |
|---|---|---|---|
| 3,259,296 | 7/1966 | Beranger | 229/5.5 |
| 3,856,199 | 12/1974 | Gartz | 229/4.5 X |
| 3,897,650 | 8/1975 | Pilston | 43/54.5 R |
| 3,949,511 | 4/1976 | Goldhaft | 43/57.5 R X |

Primary Examiner—Nicholas P. Godici
Assistant Examiner—M. Jordan
Attorney, Agent, or Firm—Albert W. Hilburger

[57] ABSTRACT

A tubular shaped device preferably of transparent pliable material for containing and dispensing fishing lures. One end of the device is sealed and has a pair of fins lying in mutually perpendicular planes containing the longitudinal axis of the device and an end portion perforated to permit fluid flow between the interior and exterior of the device. The other end of the device has an opening defined by a continuous rim and is provided with a cover hinged for movement between open and closed positions. The cover is also perforated and includes a lock which enables it to be releasably held in the closed position adjacent the rim.

11 Claims, 13 Drawing Figures

U.S. Patent May 17, 1983 Sheet 1 of 2 4,383,385
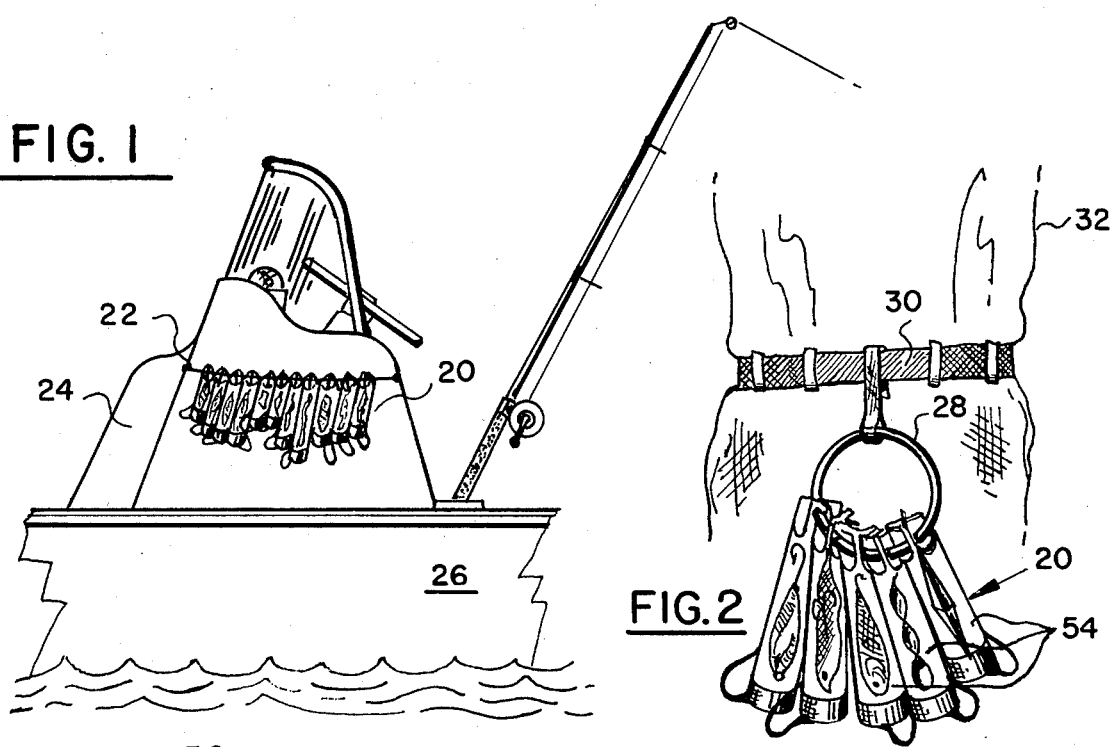
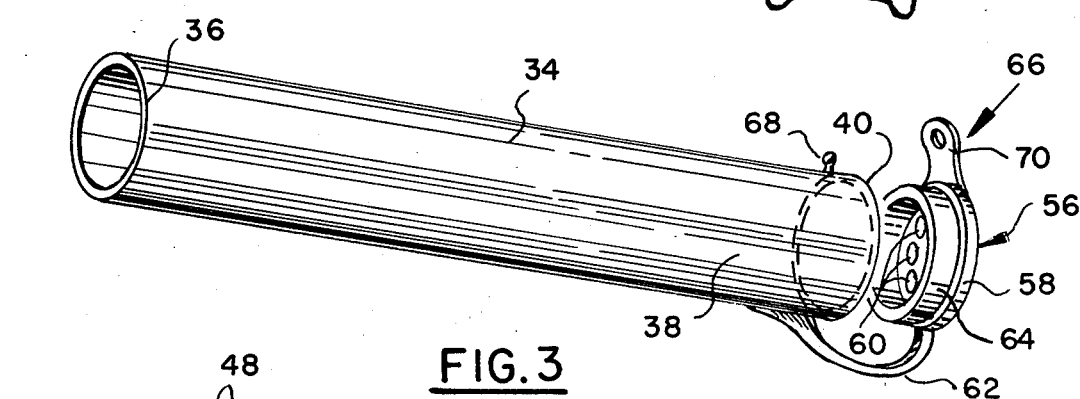
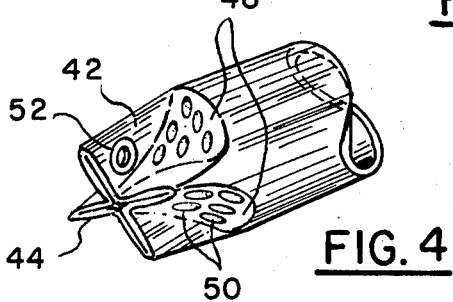
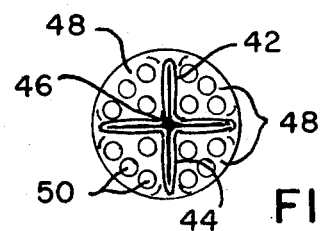
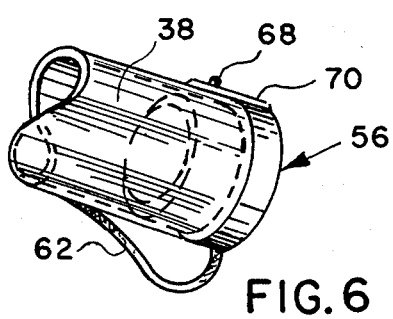
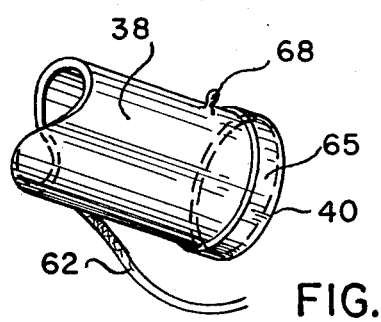

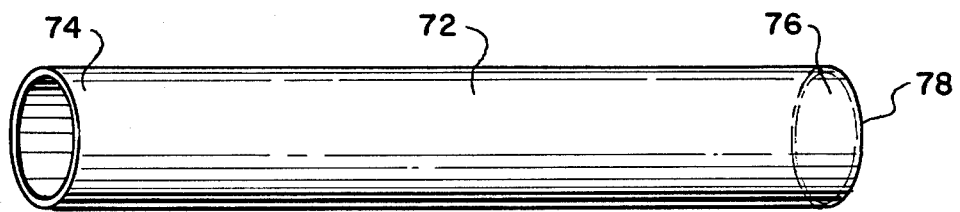
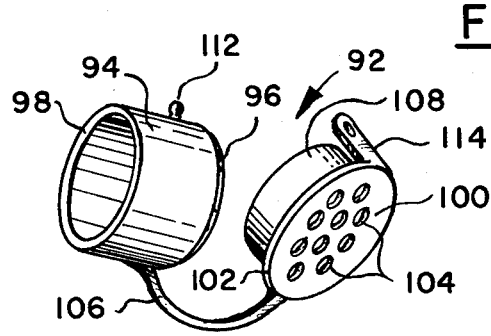
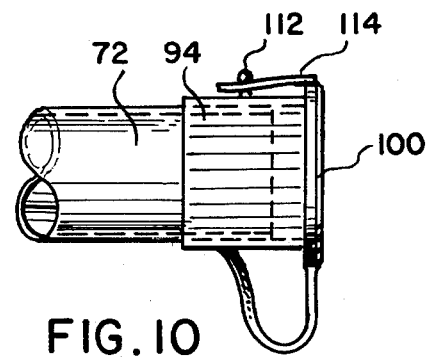
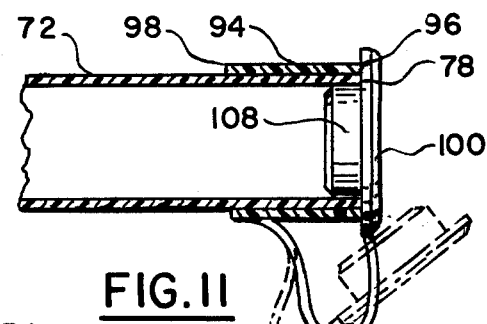
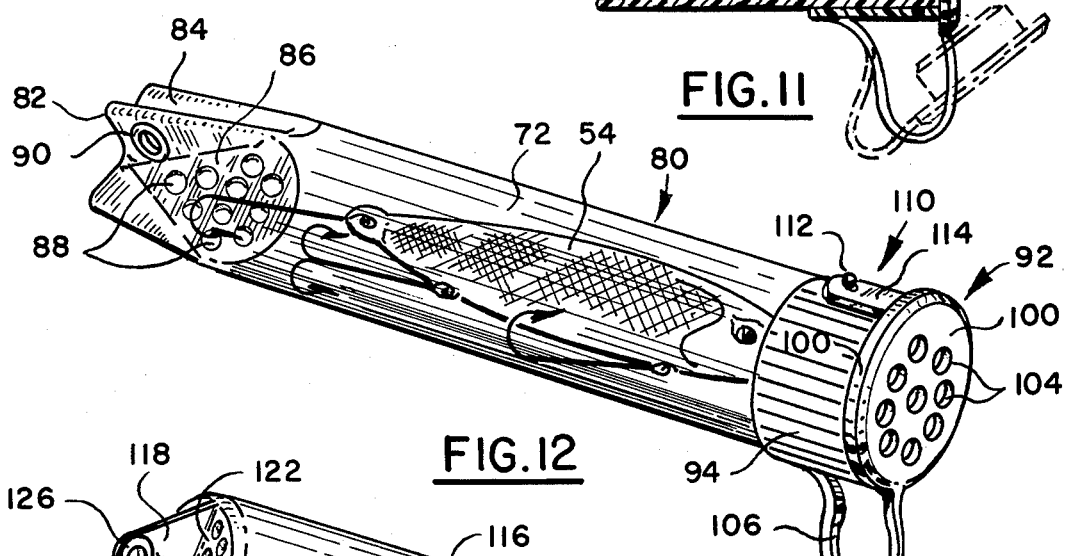
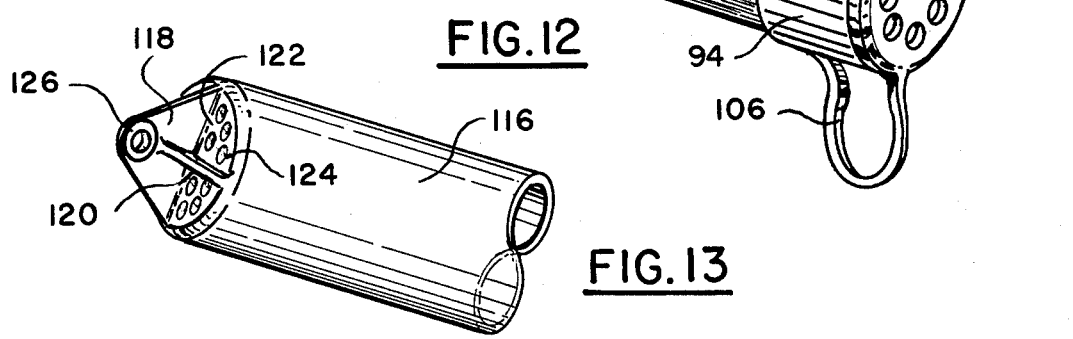

LURE CONTAINER

BACKGROUND OF THE INVENTION

1. Field of the Invention

The present invention relates generally to containers for storing, handling, displaying, marketing, and dispensing fishing lures and similar articles.

2. Description of the Prior Art

An ever present concern for a fisherman is the proper storage of his fishing lures so as to assure the well-being of the flies and fish hooks comprising the lures and at the same time avoiding personal injury to himself and to his surroundings. The hooks of the lure tend to snag various objects, including his person, and can easily become entangled with other lures and/or tackle which takes precious time from the sport and proves a test of his patience. At the same time, a fishing lure properly contained, should be readily available to the fisherman as a need arises.

Catering to the needs of the fisherman, a number of devices have been employed in the past and are known to the prior art. For example, it has been known to provide various constructions of lure containers on the belt of a fisherman as disclosed in the U.S. Pat. to Thorn, No. 2,548,080 issued Apr. 10, 1951, to Keilholz No. 2,707,583 issued May 3, 1955, and to Pilston, No. 3,897,650 issued Aug. 5, 1975. In each instance, the patent discloses individual containers for individual lures.

The patent to Holwerda, U.S. Pat. No. 2,729,913 issued Jan. 10, 1956, discloses a lure container adapted to be carried in a breast pocket and is provided with a clip for attachment to the front part of the pocket.

Another device known to the prior art is that to Pilston, U.S. Pat. No. 3,832,798 issued Sept. 3, 1974, which discloses a lure container arranged to be suspended from a necklace worn by the fisherman. Yet another lure container is in the form of a combination key holder and case for storing lures and flies as suggested in the patent to Goldhaft, U.S. Pat. No. 3,949,511 issued Apr. 13, 1976.

With proper deference being given the aforesaid patents, each of which, on its face, disclosed advances in the state-of-the-art of the construction of lure containers when each respective patent was granted, nonetheless, the present invention is deemed to be of a considerable improvement over such known devices. For example, many of the devices known to the prior art were of relatively complex construction or composed of relatively expensive materials, or, by reason of their constructions, were difficult to use or ineffective for the purpose for which they were intended. Indeed, it was with recognition of the need and of the state of the prior art that the present invention was conceived and has now been reduced to practice.

SUMMARY OF THE INVENTION

To this end, a tubular shaped device is disclosed, preferably of transparent, pliable material for containing and dispensing fishing lures. One end of the device is sealed and has a pair of fins lying in mutually perpendicular planes containing the longitudinal axis of the device and an end portion perforated to permit fluid flow between the interior and exterior of the device. The other end of the device has an opening defined by a continuous rim and is provided with a cover hinged for movement between open and closed positions. The cover is also perforated and includes a lock which enables it to be releasably held in the closed position adjacent the rim.

In one embodiment, the invention may be of one piece construction such that the cap is integral with the tubular shaped device while in another embodiment, the cap may be part of a closure member which is mounted to the tubular shaped device adjacent its open end.

The invention is of extremely simple construction and utilizes existing materials in that the tubular shaped device is preferably fashioned from this plastic material such as that currently employed in the manufacture of some toothpaste and hair shampoo containers. At one end, which may be arbitrarily defined the lower end, the tubular member is folded so as to define a pair of integral fins which lie in generally transverse planes relative to one another and which intersect in a line generally parallel to the longitudinal axis of the tubular shaped device. Those regions of the end portion lying generally between the fins are preferably perforated so as to permit fluid flow between the interior and the exterior of the device.

The opposite end of the tubular shaped device is open and defined by a continuous rim, and an appropriate closure means is provided including a cap which is moveable between open and closed positions. The cap is also perforated to permit flow of fluid between the exterior and the interior of the tubular shaped device.

One of the fins may also be provided with a grommet defining an opening to enable the device to be supported from a belt, a ring, a necklace, a chain or the like such that the lures can be kept harmlessly tangle-free yet highly visible. The top and bottom drainage holes allow free circulation of air over wet lures to dry them. Additionally, lures used in salt water can be rinsed off in fresh water without removing them from the device and the holes at both ends of the device serve not only to drain wet lures but also to prevent the formation of condensation.

Other features and advantages of the invention include its light weight construction, its design which insures safety to the user as well as protection for the lure, visibility of each lure to the fisherman and his ready access to the lure.

Other and further features, objects, advantages, and benefits of the invention will become apparent from the following description taken in conjunction with the following drawings. It is to be understood that both the foregoing general description and the following detailed description are exemplary and explanatory but are not restrictive of the invention. The accompanying drawings which are incorporated in and constitute a part of this invention are generally illustrative of the invention and, together with the description, serve to explain the principles of the invention.

DETAILED DESCRIPTION OF THE DRAWINGS

In the Drawings:

FIGS. 1 and 2 are pictorial views illustrating plural numbers of the invention in a storage condition, respectively, on a boat and at the side of an individual;

FIG. 3 is a perspective view of a part of a first embodiment of the invention in an incomplete stage of construction;

FIG. 4 is a detail perspective view of an upper end of the part illustrated in FIG. 3 but depicting its final form;

FIG. 5 is an end elevation view of the upper end illustrated in FIG. 4;

FIG. 6 is a detail perspective view of a lower end of the part illustrated in FIG. 3 and showing its final form;

FIG. 7 is a detail perspective view illustrating a modified construction of the lower end depicted in FIG. 6;

FIG. 8 is a perspective view of a part of another embodiment of the invention;

FIG. 9 is a detail perspective view of another part associated with the embodiment of FIG. 8;

FIG. 10 is a detail side elevation view of the parts illustrated in FIGS. 8 and 9 joined together;

FIG. 11 is a detail section view of the parts illustrated in FIG. 10;

FIG. 12 is a perspective view of a completed device representing the embodiment of FIGS. 8-11; and FIG. 13 is a detail perspective view of a part of another embodiment of the invention.

DESCRIPTION OF THE PREFERRED EMBODIMENTS

Refer now to the drawings, and initially to FIGS. 1 and 2 which illustrate a plurality of devices 20 incorporating the principles of the invention. For example, in FIG. 1, the devices 20 are illustrated as being suspended from a line 22 which is suitably strung across a console 24 of a boat 26. Similarly, in FIG. 2, a plurality of the devices 20 are illustrated as being suspended from a suitable ring 28 which, in turn, is suspended from a belt 30 of an individual 32. However, it will be appreciated that FIGS. 1 and 2 are merely illustrative of, and not intended to exhaust, the many ways in which the devices 20 can be stored or made available to the user.

In accordance with the invention, then, apparatus is disclosed for containing and dispensing fishing lures comprising: a tubular member of pliable material having a longitudinal axis and an outer surface and upper and lower ends, said lower end being open and defined by a continuous rim, said upper end distant from said lower end including an end portion having perforations extending therethrough and positioned generally transversely of said longitudinal axis and a pair of integral fins lying in planes generally transversely of each other and to the plane of said end portion and intersecting in a line generally parallel to said longitudinal axis, one of said fins having means for externally mounting said tubular member; and means on said tubular member adjacent said rim including a cap having a continuous outer edge and perforations extending therethrough; hinge means mounting said cap on said tubular member for selective movement between an open position distant from said rim and a closed position generally contiguous with said rim; and means for releasably holding said cap in the closed position generally contiguous with said rim.

As embodied herein, and with particular reference now to FIGS. 3-6 which illustrate a first embodiment of the invention, a tubular member 34 is illustrated in FIG. 3 as being suitably formed of a pliable or flexible plastic material. The material used may be of any suitable thickness and chemical structure, but a material which has been found to be successfully used is the plastic material often employed in the construction of tubular containers for toothpaste and hair shampoo. The member 34 has a longitudinal axis and an outer surface, but while illustrated as a cylinder, it could be of any other shape which meets the definition of being tubular. For example, it would be within the scope of the invention for the member 34 to have a square cross section rather than a circular cross section. The member 34 also has an upper end 36 and a lower end 38, the latter being defined by a continuous rim 40.

The upper end 36 is distant from the lower end 38 and is suitably operated upon such that the result is a construction as illustrated in FIG. 4. Specifically, the material of which the member 34 is composed is folded in such a manner as to form a pair of fins 42 and 44 which lie in planes which are generally transverse to each other and which intersect in a line 46 (see FIG. 6) which is generally parallel to the longitudinal axis of the member 34.

When the fins 42 and 44 have been formed, that material of which the member 34 is composed which lies between the respective fins is referred to as an end portion 48 (see FIGS. 4 and 5) which is positioned generally transversely of the longitudinal axis of the member 34 and which are provided with suitable perforations 50 which extend through the material of which the end portions are composed. Suitable mounting means 52 are preferably applied to at least one of the fins, for example, fin 42, enabling the device 20 to be externally mounted as, for example, in the manner illustrated in FIGS. 1 and 2.

When the fins 42 and 44 have been operated upon to assume the form as illustrated in FIGS. 4 and 5, the material of which the member 34 is composed can be suitably heat sealed so that the fins 42 and 44 maintain their desired shape, as shown. However any other suitable method may be employed including, but not limited to, the use of adhesives or staples. Alternatively, the mounting means 52 may be in the form of a grommet fastened to each of the fins thereby serving simultaneously as a means to retain the shape of the fins 42 and 44 at the upper end 36 of the member 34. Such a grommet, by defining an opening through the material of which the fins are composed, would provide the means for suspending the devices 20 in the manner illustrated in FIGS. 1 and 2. With the manner of construction utilizing the fins 42 and 44, the tubular member 34 may be of relatively thin walled construction and still provide a container which would at all times be held sufficiently open internally to receive a variety of multihooked fishing lures 54. In the absence of the fins 42 and 44, the tubular member 34 would merely collapse onto itself and it would be very difficult, if not impossible, for the user to withdraw and replace lures quickly and safely, sometimes in the dark, and sometimes under adverse conditions.

Closure means is provided at the lower end 38 of the member 34 in the form of a cap 56 having a continuous outer edge 58 and perforations 60 extending through the cap. A flexible hinge 62 preferably composed of the same material of which the cap 56 and the member 34 are composed serves to mount the cap 56 integrally on the tube 34 while enabling its movement between an open position as illustrated in FIG. 3 and a closed position as illustrated in FIG. 6. In the open position, the cap 56 is distant from the rim 40 (FIG. 3) and in the closed position the cap 56 is generally continguous with the rim 40 (FIG. 6). It may be desirable to form the device 20, as by molding, or otherwise, such that the cap 56, the hinge 62, and the member 34 are all fabricated in one piece. Or, employing an alternate method of manufacture, it may be desirable to form the hinge 62 in an integral manner with the cap 56, then suitably fix the resulting free end of the hinge 62 to the side wall of the member 34. In any event, it is highly desirable for purposes of the invention that the cap 56 and the member 34 be of unitary construction to prevent loss of the cap 56 when the device 20 is in use.

As seen especially in FIG. 3, the cap 56 may be provided with an annular flange 64 extending transversely of the plane of the cap from the region of the outer edge 58. The annular flange 64 is releasably engagable with lower end 38 in the vicinity of the rim 40 when the cap assumes the closed position as indicated in FIG. 6. In the latter position, the annular flange 64 is generally concentric with the axis of the member 34. Preferably, the fit between the outer surface of the flange 64 and the inner surface of the member 34 in the region of the rim 40 will be a tight one such that friction will serve to hold the cap 56 in the closed position until the user selectively disengages the cap from the rim.

Thus, with the construction just described, even though the member 34 is of generally thin walled construction, it can be used to readily receive and hold, and subsequently dispense, a fishing lure at the option of the user. Specifically, the upper end is prevented from collapsing upon itself by reason of the fins 42 and 44. Additionally, the annular flange 64, when inserted into the lower end 38 of the member 34, similarly serves to prevent the tube from collapsing upon itself and onto a lure which is contained therein. When the cap 56 is removed, either for insertion of a lure or the removal of a lure from the member 34, the lower end can be easily manipulated by the user to prevent any collapse of the member 34 which would interfere with insertion or removal of a lure. An alternative construction may be provided as illustrated in FIG. 7 wherein the lower end 38 is provided with a reinforcement ring 65 integral with the tubular member 34 adjacent the rim 40. The ring 65 serves to hold the rim 40 open even when the cap 56 is disengaged from the member 34.

It may be desirable to provide means for positively holding the cap 56 in the closed position and, to this end, the closure means already described might also include a tab lock device generally indicated at 66 having a male member 68 integral with the tubular member 34 and a female member 70 integral with the cap 56 and releasably engagable with the male member when the cap is in the closed position (FIG. 6). It will be appreciated that the tab lock device can be readily opened and closed by the user's thumb in the same general motion of opening and closing the cap 56.

In accordance with the invention, another embodiment thereof comprises a tubular member of pliable material having a longitudinal axis and an outer surface and upper and lower ends, said lower end being open and defined by a first continuous rim, said upper end distant from said lower end including an end portion having perforations extending therethrough and positioned generally transversely of said longitudinal axis and a pair of integral fins lying in planes generally transversely of each other and to the plane of said end portion and intersecting in a line generally parallel to said longitudinal axis, one of said fins having means for externally mounting said tubular member; and closure means including a tubular element mounted in contiguous relationship on the outer surface of said tubular member adjacent said first rim, said tubular element including second and third rims, said second rim being proximate to said first rim and said third rim being positioned intermediate said first rim and said end portion; a cap having a continuous outer edge and perforations extending therethrough; hinge means mounting said cap on said tubular element for selective movement between an open position distant from said rim and a closed position generally contiguous with said rim; and means for releasably holding said cap in a closed position generally contiguous with said rim.

As embodied herein, with particular reference to FIGS. 8–12 and, initially, to FIG. 8, a tubular member 72 is provided which is composed of flexible or pliable material generally of the nature as described above with respect to member 34. The member 72, like member 34, has a longitudinal axis and an outer surface and an upper end 74 and a lower end 76. The lower end 76 is open and defined by a first continuous rim 78. Although the upper end 74 is initially open as illustrated in FIG. 8, that is, at the beginning of the manufacturing process, it is operated upon in the manner described above with respect to member 34. Specifically, a device 80 as illustrated in FIG. 12 has the resultant construction whereby a pair of integral fins 82 and 84 lie in planes generally transversely of each other at the upper end 74 of the device 80. As previously described with respect to the fins 42 and 44, the fins 82 and 84 intersect in a line generally parallel to the longitudinal axis of the member 72 and define in the regions between them an end portion 86 which is positioned generally transversely of the longitudinal axis and has a plurality of perforations extending therethrough. A mounting means 90 is provided on at least one of the fins and, in the fashion of the mounting means 52, may be a grommet. Also, as in the fashion of the embodiment of FIGS. 3–6, the fins 82 and 84 may be formed and maintained in position in any suitable manner including those methods which were previously described with respect to the fins 42 and 44.

The device 80 is provided with closure means 92 (see especially FIG. 9) which include a tubular element 94 having a second rim 96 and a third rim 98. The closure means 92 also includes a cap 100 having a continuous outer edge 102 and perforations 104 extending therethrough. A hinge means 106 which may be in the form of a strap of plastic material, preferably integral with both the element 94 and the cap 100, serves to mount the cap on the element 94 for selective movement between an open position distant from the rim 96, as indicated by dotted lines in FIG. 11, and a closed position generally contiguous with the rim 78 as indicated by solid lines in FIG. 11.

The element 94 is received over the lower end 76 of the member 72 in a close fitting relationship and subsequently bonded to the member 72 in any suitable fashion. This may be accomplished, for example, by heat sealing, by use of adhesive, or even possibly by the use of mating screw threads on the outer surface of the member 72 and on the inner surface of the element 94, respectively. Such a bond between the element 94 and the member 72 may be further enhanced by forming the element 94 so as to be corrugated or ribbed, as illustrated. In this fashion, the element 94 may be made undersized, then enlarged by stretching it hoop-wise for reception onto the outer surface of the lower end 76.

Means for releasably holding the cap 100 in a closed position generally contiguous with the rim 78 include an annular flange 108 on the cap 100 which extends transversely of the plane of the cap generally from the regions of an outer edge 110. The flange 108 is releasably engagable with the lower end 76 when the cap assumes the closed positions (as seen by solid lines in FIG. 11). In this closed position, the flange 108 is preferably frictionally engaged with the inner surface of the member 72. Supplementing the frictional, but releasable, engagement between the annular flange 108 and the inner surface of the member 72 at its lower end 76, the closure means 92 may be provided with a tab lock device 110 having a male member 112 integral with the tubular element 94 and a female member 114 integral with the cap 100 and releasably engagable with the male member when the cap is in the closed position as particularly well illustrated in FIGS. 9–12. It will be appreciated that the thumb of the user can easily engage or disengage the members 112 and 114 as well as remove the cap 100 from engagement with the member 72.

It will further be appreciated that the tubular element 94 lends improved rigidity to the lower end 76 of the member 72. Thus, even with a relatively thin walled construction of the tube 72 for purposes of economy and light weight, by reason of the fins 82 and 84 at the upper end 74 and by reason of the tubular element 94 at the lower end 76, the interior of the tube 72 remains fully open for readily receiving or dispensing a lure 54.

It has been found that the greatest benefit of the fins 82 and 84 in maintaining the interior opening of the tube 72 at the upper end 74 occurs when the fins lie in planes perpendicular to one another and intersect along a line which is the center line of the tube 72. Also, by fabricating the tube 72 of a transparent material, it is easy for the user to distinguish among the various lures he is carrying so as to choose the one he most desires at any given time.

Still another embodiment of the invention is illustrated in FIG. 13. As seen in FIG. 13, a tubular member 116, which may be generally similar to members 34 and 72, is provided at its upper end with a major fin 118 and at least one minor fin 120, the fins 118 and 120 lying in planes generally transversely of each other. An end portion 122 completes the enclosure of the member 116 at its upper end and is preferably provided with a plurality of perforations 124 similar to the perforations 50 and 88, previously described. A grommet 126 is fixed to the fin 118 and, by reason of the construction illustrated in FIG. 13, is colinear with the longitudinal axis of the member 116. The grommet 126 serves as means for externally mounting the tubular member as in the manner illustrated in FIGS. 1 and 2. By reason of the fact that the grommet 126 is located on the center line of the member 116, the member hangs in a truly vertical fashion and the grommet 126 is easily located by the user by feel which is important when time is critical or when the invention is used is the dark.

As previously explained, the invention may be utilized for storing, handling, displaying, marketing, and dispensing fishing lures. In any of these instances, the lure is protected from harm or entanglement and the user is protected from personal harm which could be caused by the hooks of the lure. At the same time, it is readily available for use. For example, as illustrated in FIG. 2, it is possible to loop a large number of lures together on a ring 28, cord, or the like so as to be readily available at the side of the user. The night fisherman can enjoy the advantages of the invention's safety and accessibility by hanging different types of lures from different positions on his belt. A surf fisherman can place a number of lures in his jacket pocket thereby further increasing his mobility while chasing shore foraging schools of fish. With the invention suspended from its mounting means, the cap at the lower end can be readily opened by the user enabling the hookless head loop of the lure to drop into the fisherman's hand first. Of course, in order to achieve this benefit, it is desirable to place the lure into the device hook first such that the hook rests at the upper end of the device. Furthermore, the perforations at both ends of the device, namely both at the end portion and in the cap, allow free circulation of air over wet lures to dry them and also serve to prevent condensation. Additionally, lures used in salt water may be rinsed off in fresh water without removing them from the device.

The invention, in its broader aspects, is not limited to the specific details shown and described; departures may be made from such details without departing from the principles of the invention.

What I claim is:

1. Apparatus for containing and dispensing fishing lures comprising:

a tubular member of pliable material having a longitudinal axis and an outer surface and upper and lower ends, said lower end being open and defined by a continuous rim, said upper end distant from said lower end including an end portion having perforations extending therethrough and positioned generally transversely of said longitudinal axis and a pair of integral fins lying in planes generally transversely of each other and to the plane of said end portion and intersecting in a line generally parallel to said longitudinal axis, one of said fins having means for externally mounting said tubular member; and closure means on said tubular member adjacent said rim including a cap having a continuous outer edge and perforations extending therethrough; hinge means mounting said cap on said tubular member for selective movement between an open position distant from said rim and a closed position generally contiguous with said rim; and means for releasably holding said cap in the closed position generally contiguous with said rim.

2. Apparatus as set forth in claim 1 wherein said tubular member includes a reinforcement ring adjacent said rim.

3. Apparatus as set forth in claim 1 wherein said means for externally mounting said tubular member is colinear with said longitudinal axis.

4. Apparatus as set forth in claim 1 wherein said tubular member is generally transparent and said fins lie in planes perpendicular to one another, and wherein said means for externally mounting said tubular member includes a grommet fastened to one of said fins defining an opening therethrough.

5. Apparatus as set forth in claim 1 wherein said closure means includes an annular flange on said cap extending transversely of the plane of said cap from said outer edge and being releasably engageable with said lower end when said cap assumes the closed position.

6. Apparatus as set forth in claim 5 wherein said closure means includes a tab lock device having a male member integral with said tubular member and a female member integral with said cap and releasably engageable with said male member when said cap is in the closed position.

7. Apparatus for containing and dispensing fishing lures comprising:

a tubular member of pliable material having a longitudinal axis and an outer surface and upper and lower ends, said lower end being open and defined by a first continuous rim, said upper end distant from said lower end including an end portion having perforations extending therethrough and positioned generally transversely of said longitudinal axis and a pair of integral fins lying in planes generally transversely of each other and to the plane of said end portion and intersecting in a line generally parallel to said longitudinal axis, one of said fins having means for externally mounting said tubular member; and closure means including a tubular element mounted in contiguous relationship on the outer surface of said tubular member adjacent said first rim, said tubular element including second and third rims, said second rim being proximate to said first rim and said third rim being positioned intermediate said first rim and said end portion; a cap having a continuous outer edge and perforations extending therethrough; hinge means mounting said cap on said tubular element for selective movement between an open position distant from said rim and a closed position generally contiguous with said rim; and means for releasably holding said cap in a closed position generally contiguous with said rim.

8. Apparatus as set forth in claim 7 wherein said means for externally mounting said tubular member is colinear with said longitudinal axis.

9. Apparatus as set forth in claim 7 wherein said tubular member is generally transparent and said fins lie in planes perpendicular to one another, and wherein said means for externally mounting said tubular member includes a grommet fastened to one of said fins defining an opening therethrough.

10. Apparatus as set forth in claim 7 wherein said closure means includes an annular flange on said cap extending transversely of the plane of said cap from said outer edge and being releasably engageable with said lower end when said cap assumes the closed position.

11. Apparatus as set forth in claim 10 whereas said closure means includes a tab lock device having a male member integral with said tubular element and a female member integral with said cap and releasably engageable with said male member when said cap is in the closed position.

* * * * *